United States Patent [19]
Guyot et al.

[11] 3,890,120
[45] June 17, 1975

[54] PROCESS TO RECOVER SULPHUR FROM THE SULPHUR COMPOUNDS CONTAINED IN RESIDUAL GASES

[75] Inventors: Gilbert Guyot, Pau; Pierre Mathieu; Andre Philippe, both of Orthez; Pierre Grancher, Pau; Jean Solinhac, Orthez, all of France

[73] Assignee: Societe Nationale des Petroles

[22] Filed: Apr. 13, 1973

[21] Appl. No.: 350,913

[30] Foreign Application Priority Data
Apr. 18, 1972 France .................. 72.13568
Apr. 6, 1973 France .................. 73.12460

[52] U.S. Cl. .................. 55/62; 55/68; 55/73
[51] Int. Cl. .................. B01d 53/04
[58] Field of Search .............. 55/59, 68, 73, 74, 75, 55/77, 79, 62; 423/574, 576

[56] References Cited
UNITED STATES PATENTS

| | | | |
|---|---|---|---|
| 2,767,062 | 10/1956 | Duecker | 423/576 |
| 3,144,307 | 8/1964 | Haines | 423/576 |
| 3,363,401 | 1/1968 | Pierre et al. | 55/73 |
| 3,634,028 | 1/1972 | Hohne | 55/73 |

Primary Examiner—Charles N. Hart
Attorney, Agent, or Firm—Bacon & Thomas

[57] ABSTRACT

A process for desulphurizing residual gases containing small concentrations of hydrogen sulphide, sulphur dioxide and possibly vesicular sulphur, in which the gases are passed over an alumina-based adsorbent, at a temperature of between atmospheric temperature and 180°C, and the sulphur-loaded adsorbent is then brought into contact with a hot gaseous fluid, which desorbs the sulphur and regenerates the adsorbent. The process is characterized by the fact that the length of contact between the residual gas and absorbent is between 1 and 25 seconds, the sulphur-loaded adsorbent is subsequently regenerated, using an oxygen-free gas, particularly such a gas containing hydrogen sulphide, at a temperature of between 200° and 350°C, and regeneration is followed by blowing the regenerated adsorbent with a gas containing water vapour, to cool it to the temperature required for contact with the untreated gas. These specific operating conditions increase the level of desulphurization of residual gases, and improve its stability.

15 Claims, 3 Drawing Figures

PROCESS TO RECOVER SULPHUR FROM THE SULPHUR COMPOUNDS CONTAINED IN RESIDUAL GASES

This invention concerns the purification of gases containing sulphur compounds, and more particularly the purification of residual gases containing small concentrations of hydrogen sulphide, sulphur dioxide, and possibly vesicular sulphur, with recovery of these compounds in the form of sulphur.

Industrial residual gases, notably effluents from oil-refinery furnaces, pyrite-treatment furnaces or sulphur plants using the Claus process, still contain significant amounts of sulphur compounds, notably hydrogen sulphide, sulphuric dioxide, and possibly vesicular sulphur, and such gases cannot be discharged into the atmosphere until the content of sulphur compounds has been reduced below limits provided for by legislation on atmospheric pollution.

An existing method of desulphurizing residual gases containing small concentrations of hydrogen sulphide and sulphur dioxide involves passing them over an adsorbent, consisting of alumina, or mixtures and combinations of alumina and silica, at a temperature of between atmospheric temperature and 180°C, and then bringing the sulphur-loaded adsorbent into contact with a hot gaseous fluid, notably hot air, at a temperature of above 200°C, to desorb the sulphur fixed by the adsorbent and thus regenerate the adsorbent.

This process is subject to certain limitations, because of a considerable drop in the level of purification over a period, constituting a drawback to industrial application of the process.

The present invention aims at overcoming this drawback by offering an improved process, ensuring a high level of purification and greater stability, resulting in a larger reduction in the residual hydrogen sulphide and sulphur dioxide content of gases discharged into the atmosphere after treatment, with a corresponding increase in the amount of sulphur recovered.

In particular, during the treatment of residual gases from Claus sulphur plants using the process described in this invention, the hydrogen sulphide and sulphur dioxide contents of effluents discharged into the atmosphere can be more easily kept over a period at levels below the limits laid down by legislation, while the overall yield of the sulphur plant can be raised from 93–94 percent to approximately 98–99.5 percent, through recovery of hydrogen sulphide and sulphur dioxide in the form of sulphur, during desulphurization.

This invention to desulphurize residual gases containing small concentrations of hydrogen sulphide, sulphur dioxide and possibly vesicular sulphur, in which they are passed over an adsorbent consisting of alumina, impregnated or not, or mixtures or combinations of alumina and silica, at a temperature of between atmospheric temperature and 180°C, and the sulphur-loaded adsorbent is then brought into contact with a hot gaseous fluid to desorb the sulphur and thus regenerate the adsorbent, is characterized by the fact that the length of contact between the residual gas and adsorbent is between 1 and 25 seconds, the sulphur-loaded adsorbent is regenerated, using an oxygen-free gas at a temperature of between 200° and 350°C, regeneration is followed by blowing the adsorbent with an oxygen-free gas at a temperature of less than 180°C, to cool the adsorbent to the temperature required for contact with the untreated gas, and the blowing gas contains water vapour during at least part of the blowing operation, to rehydrate the adsorbent, so that generally it will not adsorb any more steam when brought into contact with the gas for desulphurization.

The gas used to regenerate the adsorbent can consist in particular of nitrogen, methane, rare gases, steam, carbon dioxide, mixtures of these gases, and mixtures of at least one of these gases with at least one compound such as carbon sulphide, sulphur dioxide and carbon oxysulphide.

In one particular embodiment of this process, ensuring greater stability in the level of purification, the gas used to regenerate the adsorbent contains a gaseous reducing compound, preferably hydrogen sulphide, carbon monoxide or hydrogen.

The volume of reducing compound in this particular regenerating gas is at least 5 percent, and can vary widely, the recommended volume being between 5 and 20 percent when the reducing gas is hydrogen sulphide.

The regenerating gas preferably circulates in a closed circuit from a heating zone, through a regenerating zone and a cooling zone, in which the sulphur content is separated, and back to the heating zone. The regenerating gas circuit may also comprise a branch pipe to remove the blowing gas, connecting the cooling zone on the regenerating gas circuit to the inlet of the blowing zone, and by-passing the heating zone.

In another embodiment of the process, blowing of the adsorbent after regenerating is done with a gas containing 10 to 60 percent volume of water vapour.

Blowing may be done with the same type of gas as that used to regenerate the adsorbent, such as nitrogen, with the necessary amount of water vapour added. The water vapour may be present in the blowing gas throughout blowing. For instance, the gas can consist of gas that has just been desulphurized, with the necessary amount of water vapour added if necessary. Water vapour may also be injected into the gas only during blowing, preferably when the temperature of the adsorbent has dropped below about 250°C.

The quantity of sulphur deposited on the adsorbent before regeneration can vary quite widely, depending on whether the adsorbent used is an alumina, impregnated or not, or a mixture or combination of alumina and silica, notably a natural or synthetic zeolite; however, the quantity should generally not exceed 65 percent of weight of the adsorbent, and is preferably under 50 percent of its weight.

Depending on the source of the gas to be desulphurized, the molar ratio of hydrogen sulphide to sulphur dioxide, the theoretical value of which, for a stoechiometric Claus reaction, is 2, may differ slightly or considerably from this. When it differs too much, it should be adjusted to approximately the theoretical value, before bringing the gas into contact with the adsorbent. This can be done by adding hydrogen sulphide or sulphur dioxide to the residual gas, as required or, when the residual gas comes from a Claus sulphur plant, by regulating the plant by any method known in the previous art.

The gas can be brought into contact with the adsorbent, the sulphur-loaded adsorbent regenerated, and the regenerated adsorbent cooled by blowing, using fixed-bed, mobile-bed or fluidized-bed techniques, and with parallel or counter-flow currents.

The grain size of the adsorbent is selected to suit the techniques used for the process, and the acceptable pressure drop in the installation chosen.

The recommended length of contact between the regenerated, cooled adsorbent and the untreated gas is between 4 and 10 seconds when the fixed-bed technique is used.

The process will now be described in greater detail, with reference to the accompanying figures, showing three installations in diagrammatical form.

Figure 1:
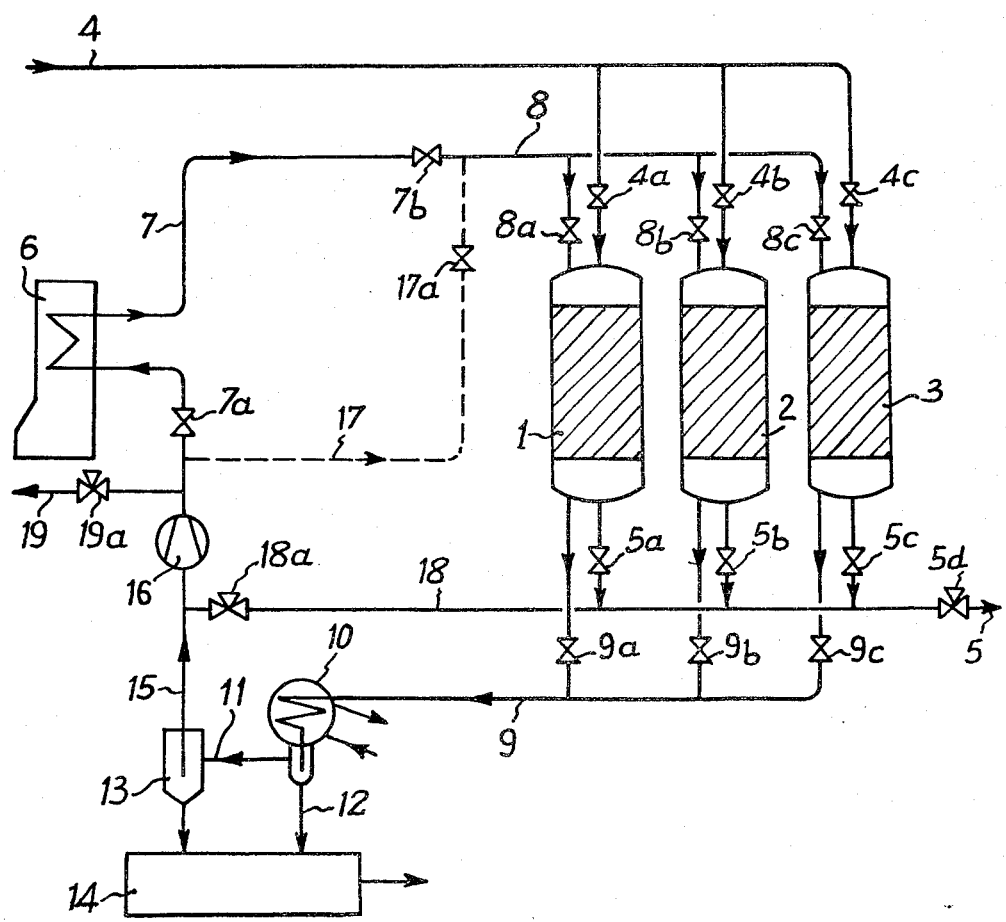
FIG. 1 shows the installation consisting of three columns.

In FIG. 1, the installation consists of three columns (1, 2 and 3) filled with an adsorbent such as activated alumina or zeolite. These columns are regenerated by permutation. In this description, it is assumed that columns 1 and 2 are performing purification, with valves 4a, 4b, 5a and 5b opened and valves 8a, 8b, 9a and 9b shut, while column 3 is performing regeneration, with valves 4c and 5c shut and valves 8c and 9c opened.

The residual gas to be desulphurized, such as effluent from a Claus sulphur plant, reaches the installation along pipe 4, and penetrates into columns 1 and 2 through valves 4a and 4b. Inside these columns, hydrogen sulphide and sulphur dioxide react in contact with the adsorbent, which also acts as a catalyst to form sulphur, by the reaction $2H_2S + SO_2 \rightarrow (3/n) S_n + 2H_2O$, the sulphur being deposited on the adsorbent. The purified residual gas leaves columns 1 and 2 along pipe 5, through valves 5a and 5b and stop-cock 5d.

The regenerating gas, which here consists of part of the purified Claus effluent, circulates in a closed circuit. It is heated to a suitable temperature of between 200° and 350°C, by indirect heat exchange in a furnace 6, and is then sent along pipes 7 and 8 to column 3, which it enters through valve 8c. Arrival of the hot regenerating gas inside column 3 causes desorption of the sulphur deposited on the adsorbent, and the gas strips it away as vapour. At the column 3 outlet, a gaseous effluent, consisting of a mixture of the regenerating gas and sulphur vapour, is discharged through valve 9c, along pipe 9 to a condenser 10, kept at a temperature of about 125° to 135°C by any suitable means, such as circulating hot water or air. The sulphur condenses into a liquid, which flows out of the condenser along pipe 12, to tank 14, from which it is removed as required. The regenerating gas, still containing a small amount of sulphur vapour, corresponding to the saturating vapour pressure of sulphur at the condenser temperature, escapes from the condenser through pipe 11, passes through a separation device 13, where the vesicular sulphur is separated, and is then sent along pipe 15, through a blower 16, to the heating furnace 6, before being reinjected into the circuit.

Regeneration of the adsorbent in column 3 is concluded by blowing the adsorbent to cool and rehydrate it. This is done by shutting valves 7a and 7b, and injecting the regenerating gas, cooled during condensation of its sulphur content, through the blower 16 into column 3, along pipes 17 and 8, through valves 17a and 8c, which are then open. On completion of blowing, valve 17a is shut and valves 7a and 7b are re-opened, after which the next column to be regenerated is brought into the regenerating gas circuit passing through the furnace 6, while the regenerated column is brought into the untreated gas circuit (4 and 5).

Part of the regenerating gas is continuously drained off through stop-cock 19a on drain pipe 19, and a corresponding volume of purified Claus gas is simultaneously injected into the regenerating gas circuit, through stop-cock 18a on pipe 18, by-passing the purified gas-removal pipe 5.

Figure 2:
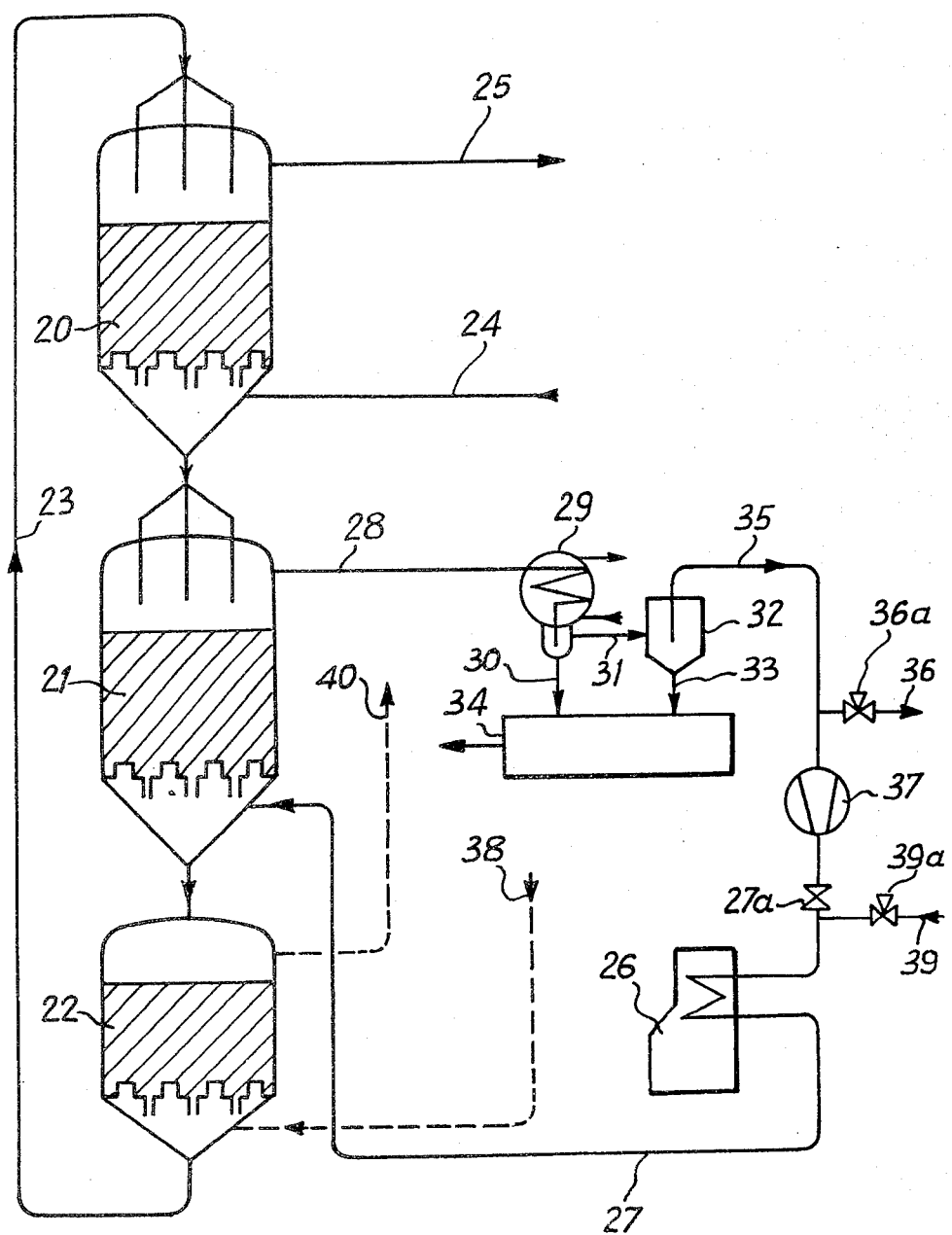
FIG. 2 shows 2 continuous closed circuit circulating system.

In FIG. 2, the adsorbent is circulating continuously in a closed circuit, passing in turn through an adsorption column 20, regeneration column 21, and cooling column 22, being returned from column 22 to column 20 by a raising system 23.

The residual gas to be desulphurized, such as effluent from a Claus sulphur plant, reaches the bottom of column 20 along pipe 24, and is discharged after treatment, at the upper end of this column, along pipe 25. The temperature inside column 20 is less than 150°C, and in contact with the adsorbent, the hydrogen sulphide and sulphur dioxide in the residual gas react with one another to form sulphur. This is deposited on the adsorbent, which also retains any vesicular sulphur in the residual gas.

The regenerating gas, which may be a mixture of nitrogen and hydrogen sulphide, reaches the bottom of the regeneration column (21) along pipe 27, after being heated in the furnace 26. Injection of this hot gas keeps the temperature inside this column permanently at between 200° and 350°C, and preferably at approximately 300°C. At this temperature, the sulphur deposited on the adsorbent during the adsorption phase inside column 20 vapourizes, and is stripped away by the regenerating gas leaving column 21 along pipe 28. The mixture of regenerating gas and sulphur vapours circulating in pipe 28 passes into a condenser 29, which is kept at a suitable temperature, and in which the sulphur condenses in the form of liquid sulphur. This flows out of the condenser along pipe 30, to a tank 34. The gas escaping from the condenser along pipe 31 passes into a separating device 32, before being sent to a blower 37, which re-injects the gas into the circuit, directing it back to the furnace 26 through valve 27a. The vesicular sulphur from the separating device 32 also flows into the tank 34, along pipe 33.

In column 22, the adsorbent is cooled and rehydrated continuously at a temperature of approximately 150°C, by being blown with a mixture of nitrogen and water vapour, reaching the bottom of column 22 along pipe 38. The blowing gas is discharged at the upper end of column 22, along pipe 40.

When necessary, part of the regenerating gas is drained off through stop-cock 36a on drain pipe 36, and a corresponding volume of fresh regenerating gas is simultaneously injected into pipe 27 above the furnace 26, arriving by feed pipe 39 through stop-cock 39a.

Figure 3:
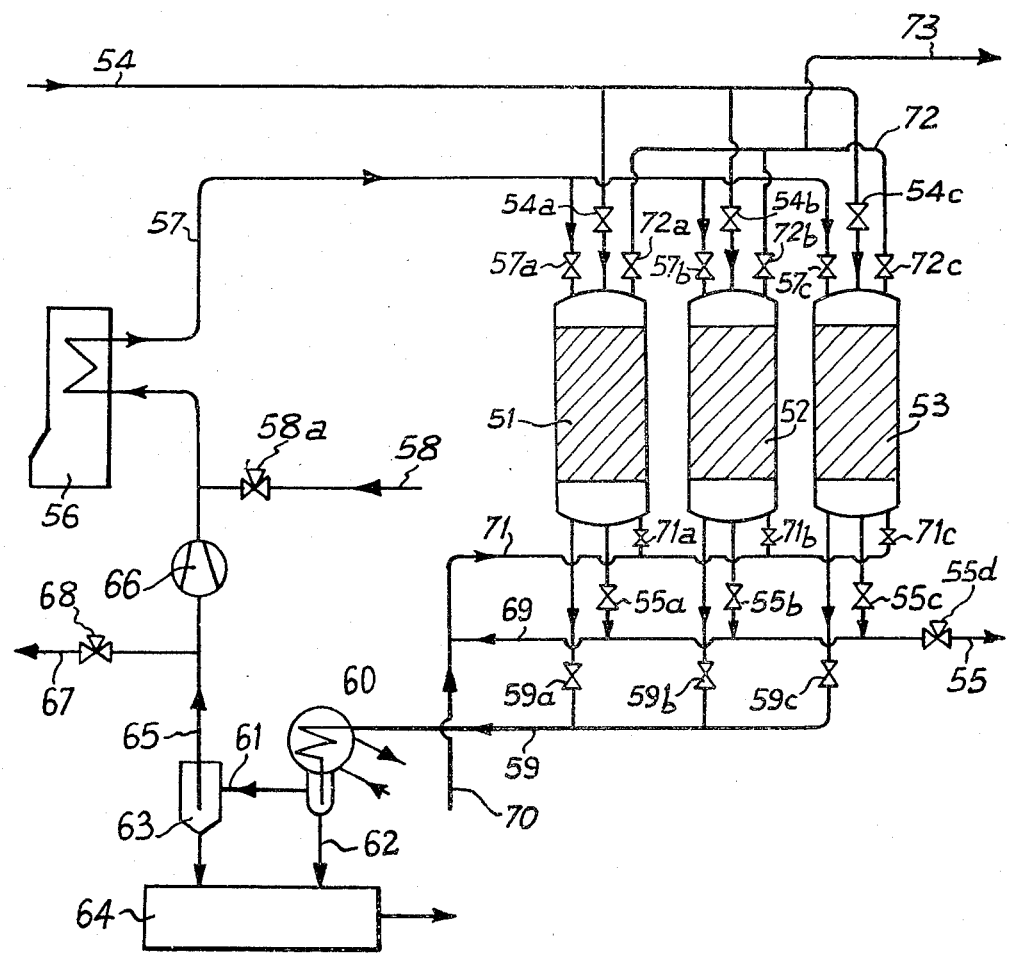

The installation shown in FIG. 3 consists of three columns (51, 52 and 53), filled with an adsorbent, such as activated alumina. Each column is used in turn for adsorption, regeneration and cooling phases. Here, column 51 is assumed to be engaged in adsorption, while column 52 is being regenerated, and column 53 cooled after regeneration; accordingly, valves 54a, 55a, 57b, 59b, 71c and 72c are open, while valves 57a, 59a, 71a, 72a, 54b, 55b, 71b, 72b, 54c, 55c, 57c and 59c are shut.

The residual gas for desulphurization, such as effluent from a Claus sulphur unit, reaches the installation along pipe 54 and enters column 51 through valve 54a. In this column, the hydrogen sulphide and sulphur dioxide react on contact with the adsorbent to form sulphur, which is deposited on the adsorbent. The purified residual gas leaves column 51 along pipe 55, through valve 55a and stop-cock 55d.

Part of the purified residual gas, at a temperature of approximately 120° to 140°C, is sent along branch pipe 69 on pipe 55, after a suitable amount of water vapour has been injected through pipe 70, to column 53, along pipe 71 and through valve 71c. On contact with this wet gas, the adsorbent in column 53, which was at the temperature for regeneration, cools slowly down to the temperature of the residual gas entering the column, and becomes gradually saturated with moisture. The gas leaving column 53 through valve 72c is sent along pipe 73 and discharged into the atmosphere.

The regenerating gas, which here consists of a mixture of nitrogen and for example 10 percent volume of hydrogen sulphide, circulates in a closed circuit. It is heated to a suitable temperature of between 200° and 350°C, by indirect heat exchange in a furnace 56, and is then sent along pipe 57 to column 52, which is in the regeneration phase, entering it through valve 57b. Arrival of the hot regenerating gas inside column 52 causes desorption of the sulphur deposited on the adsorbent, and the gas strips it away as vapour. At column 52 outlet, a gaseous effluent consisting of a mixture of the regenerating gas and sulphur vapours is collected along pipe 59, through valve 59, and sent to a condenser 60, which is kept at a temperature of approximately 125° to 135°C, and in which the sulphur condenses in the form of liquid sulphur. This flows out of the condenser along pipe 62, to a tank 64. The regenerating gas, still containing a small amount of sulphur vapour, corresponding to the saturating vapour pressure of sulphur at the condenser temperature, is discharged along pipe 61 into a separating device 63, where the vesicular sulphur is separated, and is then sent along pipe 65, through a blower 66, to the heating furnace 56, before being reinjected into the circuit. Part of the regenerating gas is continually drained off through stop-cock 68 on drain pipe 67, while a corresponding volume of fresh regenerating gas is injected, through pipe 58 and stop-cock 58a.

The process described in this invention is illustrated by the following examples, without being in any way confined to them.

EXAMPLE 1

A pilot installation corresponding to the one shown in diagrammatical form in FIG. 1 was used, comprising three columns each containing one ton of activated alumina, two being used for adsorption while the third was regenerated. Residual gas from a Claus sulphur plant, with the following average composition by volume, was fed into this installation at a rate of 1,220 Nm3/hr:

hydrogen sulphide     1.27%
sulphur dioxide     0.63%
water vapour     34%
nitrogen     51%
carbon dioxide     13.10%
vesicular sulphur     6 g/Nm3

Claus effluent accordingly circulated through each alumina-filled column on the circuit at the rate of 610 Nm3/hr.

Claus effluent accordingly circulated through each alumina-filled column on the circuit at the rate of 610 Nm3/hr.

The temperature of the residual gas was approximately 130°C on entering the columns, and it remained in contact with the alumina for approximately 10 seconds. The Claus reaction $2H_2S + SO_2 \rightarrow (3/n) S_n + 2H_2O$ occurred on contact with the alumina, and the resulting sulphur was deposited on the adsorbent.

The columns were changed over every 15 hours; in other words, each column was alternately subjected for 30 hours to the flow of untreated residual gas and for 15 hours to the flow of regenerating gas, consisting of part of the purified gas leaving the adsorption columns.

Regeneration was carried out in such a way that the regenerating gas circulated through the alumina for approximately 11 hours at a temperature of about 300°C, and for the remaining period at the temperature at which it left the blower, thus acting as the blowing gas.

During initial operating cycles, the residual gas obtained after contact with the alumina contained an average volume of 0.063 percent hydrogen sulphide and 0.031 percent sulphur dioxide, while the vesicular sulphur content was not measurable. The overall level of purification (or desulphurization) was 96.5 percent.

This dropped in succeeding cycles, stabilizing at 76 percent after 50 cycles, and remaining stable for several hundred additional cycles.

Under the conditions prevailing in the prior art, namely with contact lasting about 1 second, regeneration in air, and no blowing with moist gas, the level of purification did not show the stability obtained under the conditions proposed by the invention.

EXAMPLE 2

In a pilot installation similar to the one shown diagrammatically in FIG. 2, effluent from a Claus sulphur plant, containing 0.95 percent volume of hydrogen sulphide and 0.45 percent volume of sulphur dioxide, together with 10 g/Nm3 vesicular sulphur, was treated with activated alumina, 2 to 5 mm in diameter, circulating at a rate of 350 litres/hr.

The residual gas, circulating at a rate of 1,000 Nm3/hr, entered the adsorption column at a temperature of 120° to 140°C. The temperature of the alumina in the column was approximately 120° to 130°C, and the gas remained in contact with it for approximately 6½ seconds. The various lengths of contacts between the untreated gas and adsorbent are given for normal temperature and pressure.

Regeneration was done with nitrogen, at a temperature of approximately 280°C at the regenerating column inlet, and with a flow rate of 400 Nm3/hr, while the regenerated alumina was blown with a current of nitrogen, entering the cooling column at a rate of 600 Nm3/hr and a temperature of 120° to 130°C.

The initial level of desulphurization was 95.2 percent, dropping gradually to reach 71 percent after 50 purification cycles, after which it remained stable.

A new series of purification cycles was carried out, using the same conditions as those described above, but employing mixtures of nitrogen and water vapour for regenerating and blowing, with 30 percent volume of water vapour in the regenerating gas and 35 percent in the blowing gas.

The initial level of desulphurization was also 95.2 percent, but it dropped more slowly, and after 50 cycles was still 79 percent. It then stabilized at this level.

Comparison of the results of these two series of tests shows the favourable effect on the stability of the level of purification of blowing the regenerated adsorbent with a gas containing water vapour, to rehydrate it before the adsorption phase.

EXAMPLE 3

The desulphurization test described in Example 2 was repeated, but using a regenerating gas containing 60 percent volume of nitrogen, 30 percent water vapour and 10 percent hydrogen sulphide, and a blowing gas containing 65 percent volume of nitrogen and 35 percent water vapour.

Under these conditions, the level of purification, which was originally 95.2 percent, dropped very slowly, and after 85 cycles was still 88 percent.

EXAMPLE 4

The desulphurization test described in Example 3 was repeated, except that there was no water vapour in the regenerating gas, and it was added to the blowing gas only 2 hours after the start of each blowing phase, when the adsorbent was at a temperature of approximately 230°C.

The regenerating gas accordingly contained 90 percent volume of hydrogen and 10 percent hydrogen sulphide, while the blowing gas consisted solely of nitrogen for the first 2 hours of each phase, and subsequently of a mixture of 65 percent volume of nitrogen and 35 percent water vapour.

Under these conditions, there was almost no drop in the level of purification, which was still 95 percent after 90 cycles.

EXAMPLE 5

The desulphurization test described in Example 4 was repeated, except that the alumina was replaced by a synthetic zeolite, in the form of cylindrical granules, 5 mm in diameter and 6 to 8 mm long, with a pore diameter of approximately 5 A. The molar ratio of silica to alumina was approximately 0.15 percent.

The level of purification remained stable, and after 62 cycles was still 89 percent.

EXAMPLE 6

In a pilot installation similar to the one shown in diagrammatical form in FIG. 3, in which the columns were each filled with 1,000 kg of activated alumina in the form of balls 2 to 4 mm in diameter, a residual gas consisting of the effluent from a Claus sulphur plant, containing 1.5 percent volume of hydrogen sulphide, 0.75 percent sulphur dioxide and 2g/Nm3 vesicular sulphur, as well as 32 percent water vapour, 53 percent nitrogen and 12.7 percent carbon dioxide, was treated.

The columns were changed over in such a way that each column performed 16 hours' adsorption, followed by 16 hours' regeneration and 16 hours' cooling.

The untreated residual gas entered each adsorption column at a rate of 730 Nm3/hr and at a temperature of 120° to 140°C. The temperature of the alumina in the column was approximately 120° to 135°C, and the length of contact between the gas and the alumina was 6.6 seconds.

The sulphur-loaded adsorbent was regenerated by a mixture of nitrogen and 10 percent volume of hydrogen sulphide, entering the regeneration column at a rate of 400 Nm3/hr, and at a temperature of approximately 300°C.

The blowing gas used to cool and rehydrate the regenerated alumina consisted of part of the purified residual gas, taken from the discharge pipe leading from the adsorption columns and passed through the cooling column at a rate of 250 Nm3/hr.

On completion of blowing with the moist gas, the alumina was rehydrated and its temperature was approximately 130°C.

The purified residual gas contained only 0.15 percent volume of hydrogen sulphide and 0.075 percent sulphur dioxide, and there was no vesicular sulphur content.

This purification rate, directly linked to the activity of the adsorbent, remained stable, and could still be observed after 110 cycles.

The results obtained in this example, and those for Examples 3 and 4, show that the increased stability of the level of purification resulting from blowing the regenerated adsorbent with a gas containing water vapour to rehydrate it before the adsorption phase (see Example 2) can be further improved by regenerating the adsorbent with a gas containing a reducing compound, particularly hydrogen sulphide.

Regeneration of the adsorbent with a gas containing hydrogen sulphide, combined with blowing of the regnerated adsorbent with a gas containing water vapour give a level of purification that remains stable at 88 to 95 percent. The greatest stability, a rate of approximately 95 percent over more than 90 cycles, was obtained when there was no water vapour in the regenerating gas containing hydrogen sulphide, and it was added to the blowing gas only when the temperature of the adsorbent had dropped below approximately 250°C.

We claim:

1. In a process for desulphurizing residual gases containing small concentrations of hydrogen sulphide, sulphur dioxide and possibly vesicular sulphur, wherein said residual gases are passed over an adsorbent comprising alumina, mixtures of alumina and silica or combinations of silica and alumina, at a temperature of between atmospheric temperature and about 180°C, and the sulphur-loaded adsorbent is then brought into contact with a hot regenerating gas to desorb the sulphur and thus regenerate the adsorbent, the improvements comprising: controlling the contact time between the residual gases and adsorbent to between about 1 and 25 seconds, using an oxygen-free gas at a temperature of between about 200° and 350°C as the hot regenerating gas to desorb the sulphur and thus regenerate the adsorbent and blowing the adsorbent with an oxygen-free gas at a temperature of less than 180°C after the regeneration step to cool the adsorbent to a temperature required for contact with the untreated residual gases in a repeated operation, the blowing gas which is used to cool the adsorbent containing water vapor during at least part of the blowing operation to rehydrate the adsorbent so that it will not adsorb any more steam when brought into contact with the untreated gas.

2. A process as defined in claim 1, in which the regenerating gas is selected from the group consisting of nitrogen, methane, rare gases, water vapour, carbon dioxide, mixtures of such gases and mixtures of at least one of these gases with at least one compound of the group consisting of carbon sulphide, sulphur dioxide and carbon oxysulphide.

3. A process as defined in claim 1, in which the regenerating gas contains at least 5 percent volume of a gaseous reducing compound.

4. A process as defined in claim 3, in which the gaseous reducing compound is selected from the group consisting of hydrogen sulphide, carbon monoxide and hydrogen.

5. A process as defined in claim 4, in which the gaseous reducing compound in the regenerating gas consists of 5 to 20 percent volume of hydrogen sulphide.

6. A process as defined in claim 1, in which the regenerating gas circulates in a closed circuit through a heating zone, a regeneration zone containing the adsorbent to be regenerated, a cooling zone to condense sulfur and then back to the heating zone.

7. A process as defined in claim 6, in which the blowing gas is taken from the regenerating gas circuit at a point following the cooling zone and before the heating zone and is used to cool and rehydrate the regenerated adsorbent.

8. A process as defined in claim 1, in which the blowing gas contains 10 to 60 percent volume of water vapour.

9. A process as defined in claim 1, in which water vapour is present in the blowing gas throughout blowing.

10. A process as defined in claim 9, in which the blowing gas consists of the gas just desulphurized, with a suitable quantity of water vapour added if necessary.

11. A process as defined in claim 1, in which water vapour is injected into the blowing gas only during blowing, when the temperature of the adsorbent has dropped below approximately 250°C.

12. A process as defined in claim 1, in which the length of contact between the untreated residual gas and adsorbent is between 4 and 10 seconds when the fixed-bed technique is used.

13. A process as defined in claim 1, in which the quantity of sulphur deposited on the adsorbent before regeneration is not more than 65 percent of the weight of the adsorbent.

14. A process as defined in claim 13, in which the quantity of sulphur deposited on the adsorbent before regeneration is less than 50 percent of the weight of the adsorbent.

15. A process as defined in claim 1, in which the molar ratio of hydrogen sulphide to sulphur dioxide in the untreated residual gas is adjusted to or near to 2 before the gas is brought into contact with the adsorbent.

* * * * *

UNITED STATES PATENT OFFICE
CERTIFICATE OF CORRECTION

PATENT NO. : 3,890,120

DATED : June 17, 1975

INVENTOR(S) : Gilbert Guyot; Pierre Mathieu; Andre Philippe Pierre R. Grancher and Jean A. Solinhac It is certified that error appears in the above-identified patent and that said Letters Patent are hereby corrected as shown below:

Correct the name for the Assignee to read ---Societe Nationale des Petroles d'Aquitaine---

IN THE SPECIFICATION

Col. 3, line 13, after shows, change "2" to ---a---

Col. 5, lines 65-67, cancel "Claus effluent accordingly... of 610/Nm3/h"

Signed and Sealed this twenty-fifth Day of May 1976

[SEAL]

Attest:

RUTH C. MASON
Attesting Officer

C. MARSHALL DANN
Commissioner of Patents and Trademarks